United States Patent [19]

Lescinsky et al.

[11] 4,087,786
[45] May 2, 1978

[54] ONE-BIT-OUT-OF-N-BIT CHECKING CIRCUIT

[75] Inventors: Frank William Lescinsky; Tarmo Tammaru, both of Middletown, N.J.

[73] Assignee: Bell Telephone Laboratories, Incorporated, Murray Hill, N.J.

[21] Appl. No.: 748,654

[22] Filed: Dec. 8, 1976

[51] Int. Cl.$^2$ .............................................. G06F 11/08
[52] U.S. Cl. ........................................... 340/146.1 AB
[58] Field of Search ................ 340/146.1 AB; 328/92; 307/215, 216

[56] References Cited

U.S. PATENT DOCUMENTS

| | | | |
|---|---|---|---|
| 3,458,240 | 7/1969 | Hanson | 328/92 |
| 3,559,167 | 1/1971 | Carter et al. | 340/146.1 AB |
| 3,614,735 | 10/1971 | Mauger et al. | 340/146.1 AB |
| 3,619,583 | 11/1971 | Arnold | 328/92 |
| 3,744,024 | 7/1973 | Russell et al. | 340/146.1 AB |
| 3,855,536 | 12/1974 | Neuner | 328/92 |
| 3,886,520 | 5/1975 | Christensen | 340/146.1 AB |

OTHER PUBLICATIONS

Williams, Parity–Check Generate Circuit, IBM Technical Disclosure Bulletin, vol. 12, No. 4, Sep. 1969, p. 623.

Greenhalgh, Exclusive "OR" Circuit, IBM Technical Disclosure Bulletin, vol. 2, No. 6, Apr. 1960, pp. 98–99.

*Primary Examiner*—Charles E. Atkinson
*Attorney, Agent, or Firm*—Roy C. Lipton; Charles Scott Phelan

[57] ABSTRACT

A one-bit-out-of-n bit checking circuit is comprised of $k$ serially connected detector levels. A first one of the detector levels accommodates $n$ input signal lines and successively higher ones of the detector levels have one half the number of input signal lines as does the next lower detector level. Each detector level is comprised of a plurality of logic blocks with each logic block being connected to a separate pair of input signal lines. Each logic block in each level detects the presence of excitation signals on both input signal lines of the pair of input signal lines and generates an error signal in response thereto. Each logic block also detects the presence of an excitation signal on one input signal line of the pair of input signal lines and in response thereto propagates the excitation signal through successively higher detector levels to the $k^{th}$ detector level. The $k^{th}$ detector level generates an excitation signal output in response to the presence of an excitation signal on one and only one of the input signal lines applied to the $k^{th}$ level.

5 Claims, 5 Drawing Figures

ONE-BIT-OUT-OF-N-BIT CHECKING CIRCUIT

FIELD OF THE INVENTION

This invention relates to one-bit-out-of-$n$-bit checking or detecting circuits and more particularly to one-bit-out-of-$n$-bit detectors which are comprised of serially connected detector levels having identical logic blocks.

DESCRIPTION OF THE PRIOR ART

One-out-of-$n$ detectors are utilized to check the presence of an excitation signal on one and only one input signal line out of $n$ input signal lines. Such detectors are widely used and find application where the absence of excitation signals or the presence of two or more excitation signals on the $n$ input signal lines is indicative of an error condition and corrective action must be taken before processing of the excitation signals on the $n$ input signal lines can occur.

Various techniques are known to provide one-out-of-$n$ detection. A basic technique is to individually apply each one of the $n$ input signal lines along with the inverse of the $n-1$ remaining input signal lines to a separate logical AND gate. The presence of an excitation signal on one and only one of the $n$ input signal lines applies an enabling signal to one input of a particular AND gate. The remaining $n-1$ input signal lines applied to that same gate do not have excitation signals thereon. However, these remaining $n-1$ input signals are inverted such that the absence of excitation signals on these $n-1$ lines results in enabling signals being applied to all the remaining inputs to the AND gate. Thus, the one particular gate will be enabled and will indicate the presence of an excitation signal on one and only one of the $n$ input signal lines. This technique requires $n$ gates, each having $n$ inputs to accommodate the $n$ input signal lines. Moreover, as the number of signal lines increase and the number of gates correspondingly increase, the number of inputs per each gate also increases. Logic gates are normally fabricated on integrated circuit packs and it is impractical to provide more than one 8-input gate in a single circuit pack. Therefore, as the number of inputs per gate increases beyond eight, it becomes necessary to assemble higher input gates from additional circuit packs thereby increasing the number of gates and the number of circuit packs needed.

Another technique utilized to provide one-out-of-$n$ detection is illustrated by U.S. Pat. No. 3,744,024, issued to S. L. Russell et al. on July 3, 1973. In this patent, the $n$ input signal lines are applied to a matrix gating circuit which divides the $n$ inputs into two groups of signal lines. The groups are arranged such that an excitation signal on any one of the $n$ input signal lines will be represented in each of the two groups. The signal lines from each group are then applied to two basic one-out-of-$n$ detection circuits as described above which detect the presence of one excitation signal in each group of signal lines. The detector output from each group is combined to provide a common output indication. Dividing the $n$ inputs into two groups provides a savings in required gates over the basic approach described above. However, this technique still results in an increase in the number of inputs to the detection gates as the number $n$ increases.

It is a broad object of this invention to provide a one-out-of-$n$ detection circuit that requires fewer inputs per logic gate and is more economical than prior art one-out-of-$n$ detector circuits.

It is another object of this invention to provide a one-out-of-$n$ detection circuit where the number of inputs per gate does not increase as the number of input signal lines increases.

It is a further object of this invention to provide a one-out-of-$n$ detection circuit which is simple to design for any integer $n$ and can be readily expanded to larger values of $n$.

SUMMARY OF THE INVENTION

In accordance with this invention, $k$ successive detector levels are serially connected, a first one of the detector levels accommodating $n$ input signal lines and successive higher ones of the detector levels having one half the number of input signal lines as does the next lower detector level, the input signal lines being arranged in pairs. Each detector level is comprised of a plurality of logic blocks, with each logic block being connected to a separate pair of input signal lines thereby limiting the number of inputs to each logic block to two signal lines. A first detector level is comprised of $2^{k-1}$ logic blocks, successively higher detector levels have one half the number of logic blocks as does the next lower detector level and the $k^{th}$ detector level has one logic block.

It is a feature of the invention that each logic block in each detector level detects the presence of excitation signals on both input signal lines of the pair of input signal lines and generates an error signal in response thereto.

It is a further feature of the invention that each logic block in each detector level detects the presence of an excitation signal on one input signal line of the pair of input signal lines, and in response thereto propagates the excitation signal to an input line of the next successively higher detector level. The $k^{th}$ detector level generates and excitation output signal in response to presence of an excitation signal on one and only one of the input signal lines applied to the $k^{th}$ detector level.

The foregoing and other objects and features of this invention will be more fully understood from the following description of an illustrative embodiment thereof in conjunction with the accompanying drawings.

DETAILED DESCRIPTION

Figure 1:
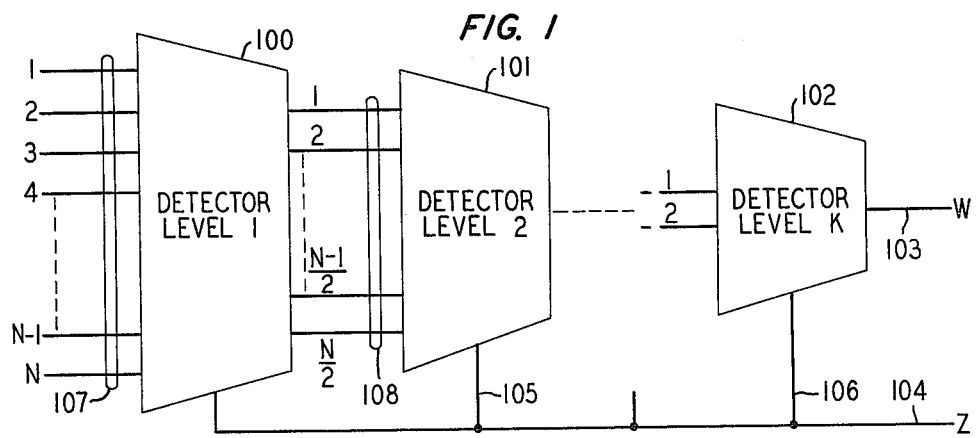
FIG. 1 discloses a block diagram representation of a one-out-of-$n$ detector in accordance with the invention.

Refer to FIG. 1. Therein is shown a block diagram representation of a one-out-of-$n$ detector. The detector is comprised of a number of serially connected detector levels $k$ with level 1 having $n$ input signal lines and successively higher detector levels having one half the number of input signal lines as does the next lower detector level. The number of detector levels required is related to the number of detector inputs by the expression $2^{k-1} < n \leq 2^k$ where $k$ is an integer. As is shown in FIG. 1, the $n$ input signal lines 107 are arranged in pairs and applied to detector level 1. Detector level 1 examines each pair of input signal lines for the presence of excitation signals on one or both input signal lines of a pair of input signal lines. If excitation signals are present on both input signal lines of any pair of input signal lines, detector level 1 generates an error signal and applies this signal to output line 104. The presence of an error signal on output line 104 is therefore an indication that excitation signals have been detected on both input signal lines of any pair of input signal lines.

Detector level 1 also detects the presence of an excitation signal on one input signal line of any pair of input signal lines. When this occurs, the one excitation signal from the pair of input signal lines is propagated through level 1 and is applied to predetermined ones of input signal lines 108 of detector level 2. Detector level 2 examines input signal lines 108 in the same manner that detector level 1 examined input signal lines 107. If excitation signals are present on both input signal lines of any of the separate pairs of input signal lines 108, detector level 2 generates an error signal and applies the error signal to path 104 via path 105. Again the error signal is an indication that excitation signals were present on both input signal lines of any pair of input signal lines. If detector level 2 determines that an excitation signal is present on only one input signal line of any pair, the one excitation signal is propagated through level 2 and is applied to the next detector level. Successively higher detector levels operate in the same manner as do detector levels 1 and 2. That is, each detector level generates an error signal in response to the presence of excitation signals on both input signal lines of any pair of input signal lines and each detector level propagates an excitation signal to higher detector levels when the excitation signal is present on only one input signal line of any pair of input signal lines.

The $k^{th}$ detector level is the final detector level and operates in the same manner as does each lower level. The $k^{th}$ level has only two input signal lines and will generate an error signal if excitation signals are present on both input signal lines. Alternatively, if an excitation signal is present on only one of the input signal lines, level $k$ applies the one signal to output path 103. The presence of an excitation signal on path 103 in conjunction with the absence of an error signal on path 104 is an indication that the one-out-of-$n$ detector has determined that one and only one of the $n$ input signal lines applied to level 1 has an excitation signal thereon. This condition can readily be detected by a logical AND gate connected to output lines 103 and 104. Such an AND gate is not part of the invention and is therefore not shown.

Figure 2:
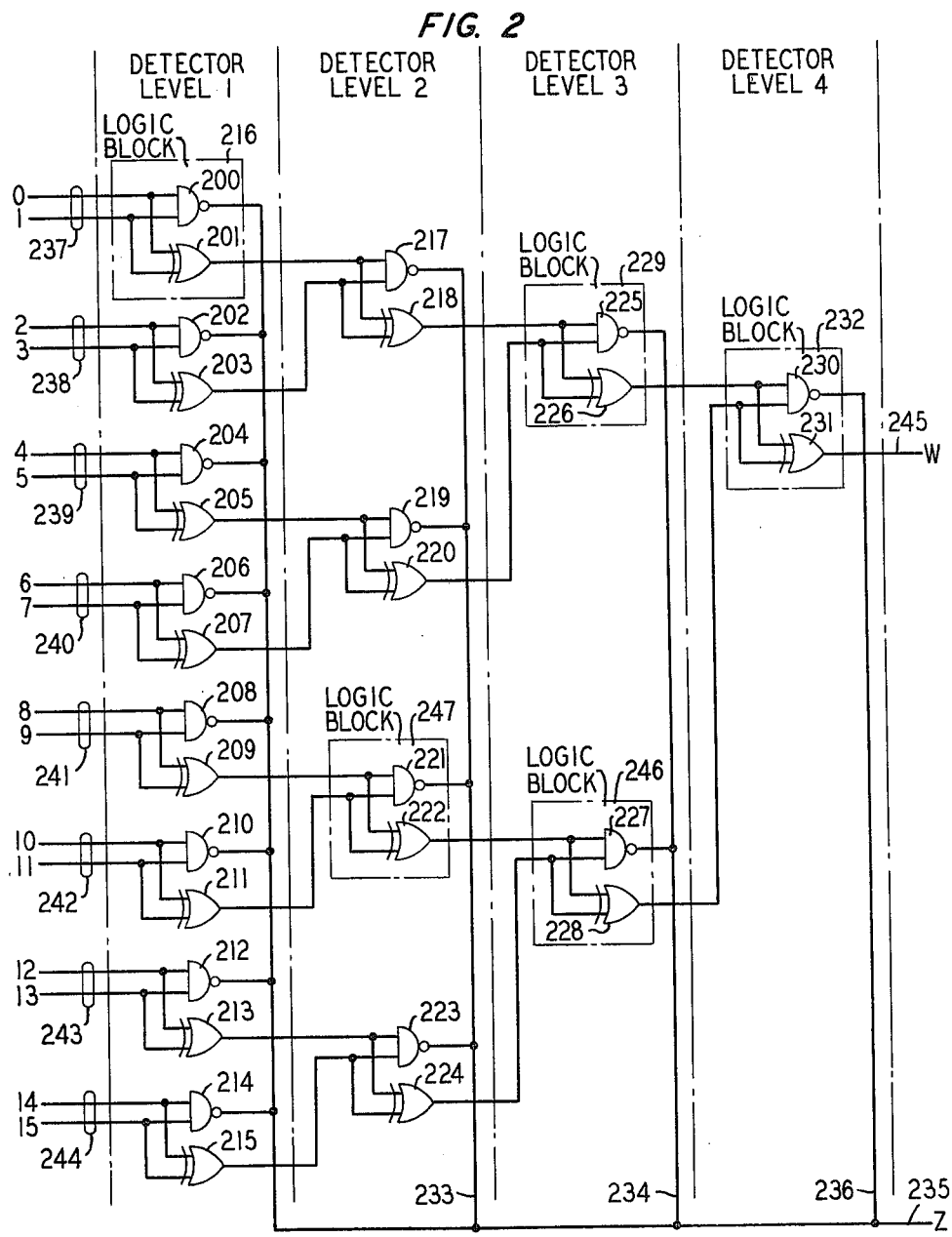
FIG. 2 discloses the details of a one-out-of-16 detector.

Refer to FIG. 2. Therein is shown a detailed representation of a one-out-of-16 detector. The detector consists of four detector levels with each level consisting of a plurality of logic blocks such as logic blocks 216, 229 and 232. Detector level 4 contains one logic block, level 3 contains two logic blocks, level 2 contains four logic blocks, etc. In general, the number of logic blocks $x$ required for a particular detector level $i$ can be expressed by the relationship $x_i \leq 2^{k-i}$, where $k$ is an integer and is equal to the number of detector levels, and $i$ denotes the particular detector level. Successively higher detector levels have one half the number of logic blocks as does the next lower detector level (this applies to a standard detector as will be detailed hereinafter) and the $k^{th}$ detector level always contains one logic block. Each logic block is in turn comprised of a logical NAND gate in parallel with a logical EXCLUSIVE-OR gate. Each logic block has two inputs and the same number of outputs. Utilization of the logic blocks is designing a one-out-of-$n$ detector allows the detector to be easily expanded to accommodate any number of inputs. Also, each logic block consists of standard two input gates. Therefore, as the number of inputs to the detector increases, the number of logic blocks needed also increases, but the number of inputs to each logic block remains the same. In this manner a detector of any size can be constructed by utilizing a standard logic block comprised of standard two input gates. This configuration does not require the number of inputs per gate to increase as the number of inputs to the detector increases and therefore eliminates the need to utilize other than standard two input gates.

The detector in FIG. 2 provides an unique output indication for each of three input conditions. These three input conditions are no excitation signals present on the input signal lines, one excitation signal present, and two or more excitation signals present on the input signal lines. Assume, for example, that no excitation signals are present on any of the input signal lines applied to detector level 1. With this input state, the output of each NAND gate in each logic block in detector level 1 will be equal to a logical "1". The output of each EXCLUSIVE-OR gate in detector level 1 will be equal to a logical "0". The outputs of all NAND gates in detector level 1 are applied to output line 235 thereby maintaining detector output Z at a logical "1" level. The outputs of the EXCLUSIVE-OR gates in detector level 1 are applied to the next higher detector level which is detector level 2. All input signal lines to detector level 2 are therefore at a logical "0" state which is the same condition assumed for the input signal lines applied to detector level 1. Detector level 2 operates in the same manner as does detector level 1 and therefore applies a logical "1" to path 235 via path 233 and also applies a logical "0" to the input signal lines of detector level 3. Detector level 3 operates in the same manner and applies a logical "1" to output line 235 and a logical "0" to the two input lines of detector level 4. Detector level 4 in turn applies a logical "1" to output line 235 and a logical "0" to output line 245. Therefore it can be seen that for the condition of no excitation signals being applied to level 1, output W of the detector will be equal to a logical "0" and output Z of the detector will be equal to a logical "1".

Assume now the presence of an excitation signal on one and only one of the input signal lines applied to detector level 1. More specifically, assume the presence of an excitation signal on one input signal line of pair 241. The remaining input signal line of pair 241 is at a logical "0" as are all remaining input signal lines. Gate 208 in response to this excitation signal applies a logical "1" to detector output Z via path 235. The outputs of all remaining NAND gates in detector level 1 also apply a logical "1" to detector output Z. Gate 209 in response to the excitation signal applies a logical "1" to one input of gate 221 and to one input of gate 222. The remaining inputs to gates 221 and 222 are at the logical "0" state. Therefore, gate 221 applies a logical "1" to detector output Z, and gate 222 applies a logical "1" to one input of gates 227 and 228. Gate 227 applies a "1" to detector output Z and gate 228 applies a logical "1" to one of the inputs to gates 230 and 231. Gate 230 in turn applies a logical "1" to detector output Z and gate 231 applies a logical "1" to detector output W. Therefore it can be seen that the presence of one and only one excitation signal on the input signal lines applied to detector level 1 results in detector output Z and detector output W being at the logical "1" states. This condition is a valid indication of the presence of one excitation signal on the $n$ input signal lines which can be detected, for example, by a logical AND gate (not shown) connected to detector outputs W and Z.

Assume now the presence of excitation signals on both input signal lines of pair 240 being applied to detector level 1. The presence of two excitation signals on the input signal lines to detector level 1 indicates an error condition and in response thereto gate 206 applies a logical "0" to detector output Z. Gate 207 in turn applies a logical "0" to one of the inputs of gates 219 and 220. The outputs of the remaining NAND gate in detector level 1 would normally be at the logical "1" state as the remaining inputs applied to detector level 1 are at the logical "0" state. However, as previously described, the output of gate 206 is at the logical "0" level. This therefore forces detector output Z to remain at the logical "0" level notwithstanding the outputs of the remaining NAND gates in detector level 1. For any one of the NAND gates in any detector level to force detector output Z to a logical "0" level it is clear that all of the NAND gates utilized in the detector must be of the type known as an "open collector gate". Gate 219 has logical "0's" applied to both of its inputs which results in a logical "1" being applied to line 233. However, as the output of gate 206 is at a logical "0" state, the output of gate 219 will be forced to the same state. Gate 220 applies a logical "0" to one input of gates 225 and 226. Gate 225 operates in the same manner as did gate 219. Gate 226 in turn applies a logical "0" to one input of gates 230 and 231. The remaining inputs to gates 230 and 231 are also at the logical "0" level. In response thereto, gate 230 applies a logical "1" to line 236 which is forced to the logical "0" state by gate 206. As previously described, gate 231 applies a logical "0" to detector output W. Therefore it can be seen that the presence of excitation signals on both input signal lines of any pair of input signal lines applied to level 1 results in detector outputs W and Z being at the logical "0" state.

Assume the presence of an excitation signal on one line of both input signal line pairs 241 and 242. In response to these two signals, gates 208 and 210 apply logical "1's" to detector output Z and gates 209 and 211 apply logical "1's" to both inputs of gates 221 and 222. Gates 221 and 222 comprise logic block 247. This logic block detects the presence of excitation signals on both of its input lines. This is an error condition and in response thereto, gate 221 applies a logical "0" to output line 235. This therefore forces detector output Z to the logical zero level. Gate 222, in response to the excitation signals, applies a logical "0" to the inputs of gates 227 and 228. The output of gate 227 remains high, but is forced low due to gate 221, as previously described. Gate 228 applies a logical "0" to one input of logic block 232. Gate 231 in response to this signal applies a logical "0" to detector W. From the previous description, it is apparent that the logic blocks in detector level 1 examined the pairs of input signal lines applied thereto and determined that an excitation signal was present on one line of two separate pairs of lines. The logic blocks in detector level 1 propagated both of these excitation signals to detector level 2 and more specifically, applied the signals to the inputs of logic block 247. Logic block 247 detected the presence of excitation signals on both input lines of the pair of lines applied to that logic block. This condition resulted in logic block 247 applying an error signal to detector output Z via paths 233 and 235 thereby giving an immediate indication of the presence of at least two excitation signals being applied to the detector input.

Assume the presence of an excitation signal on one line of both input signal line pairs 241 and 244. Gates 209 and 215 propagate the two excitation signals to detector level 2. Gates 222 and 224 in detector level 2 continue the propagation of the excitation signals to both inputs of logic block 246. The presence of excitation signals on both of its inputs is detected by logic block 246 which forces detector output Z to the logical "0" level, thereby indicating an error condition. In a similar manner, the presence of excitation signals on one input signal line of input signal line pairs 237 and 244 will result in the propagation of both excitation signals through gates 201, and 215, 218 and 224, 226 and 228, and from there to both inputs of logic block 232. This logic block in response thereto forces detector output Z to the logical "0" level. From the previous description therefore, it can be seen that each logic block in each level examines a separate pair of input signal lines for the presence of excitation signals. The presence of excitation signals on both input signal lines of any given pair results in an immediate error condition being applied to detector output Z. If only one input signal line of any given pair has an excitation signal thereon, that signal is propagated to successively higher detector levels. This propagation process continues until a particular logic block has excitation signals applied to both inputs. This condition will always occur in one of the $k$ detector levels if two or more excitation signals are applied to the inputs of detector level 1. If, however, only one excitation signal has been applied to detector level 1, this signal is propagated through each level and is finally utilized by the $k^{th}$ level (level 4) to apply an output signal to detector output W. The presence of an output signal on detector output W in conjunction with the absence of an error signal on detector output Z is an indication of a valid input indication defined as the presence of only one excitation signal present on the input signal lines of detector level 1.

Figure 3:
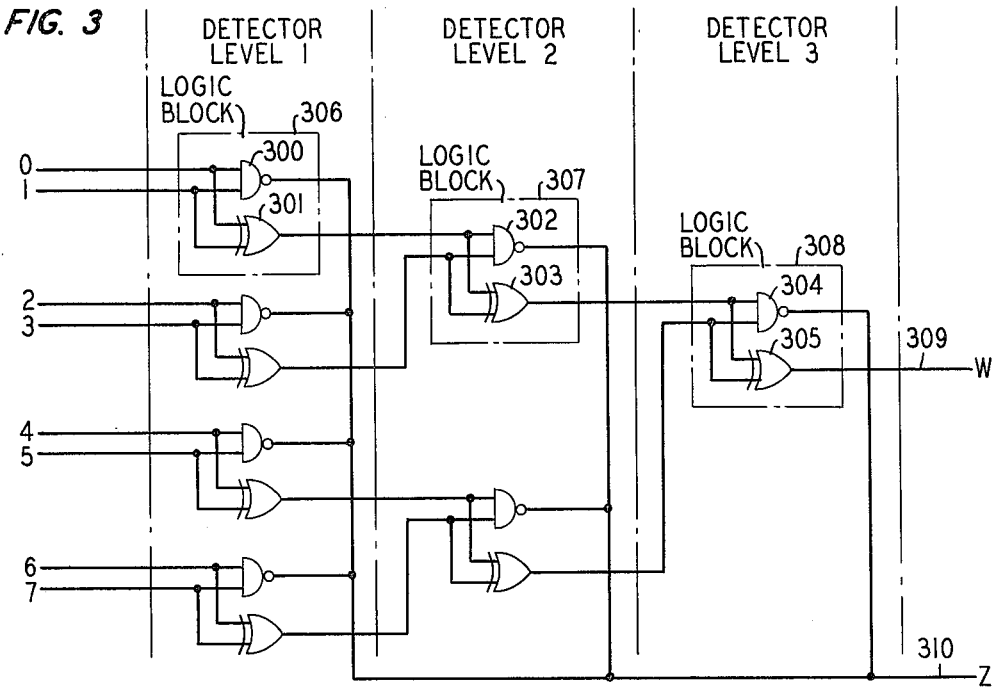
FIG. 3 discloses the details of a one-out-of-8 detector.

FIG. 3 illustrates a one-out-of-8 detector circuit. As is shown therein, this detector consists of three levels with a first level having $2^{k-1}$ logic blocks, and successively higher levels having one half the number of logic blocks as does the next lower level. Similarly, this detector accommodates $2^k$ inputs at the first level with each higher level being one half the number of inputs as does the next lower level. The one-out-of-8 detector shown in FIG. 3 operates in the same manner as does the one-out-of-16 detector in FIG. 2 and therefore a detailed circuit description will not be given.

Figure 4:
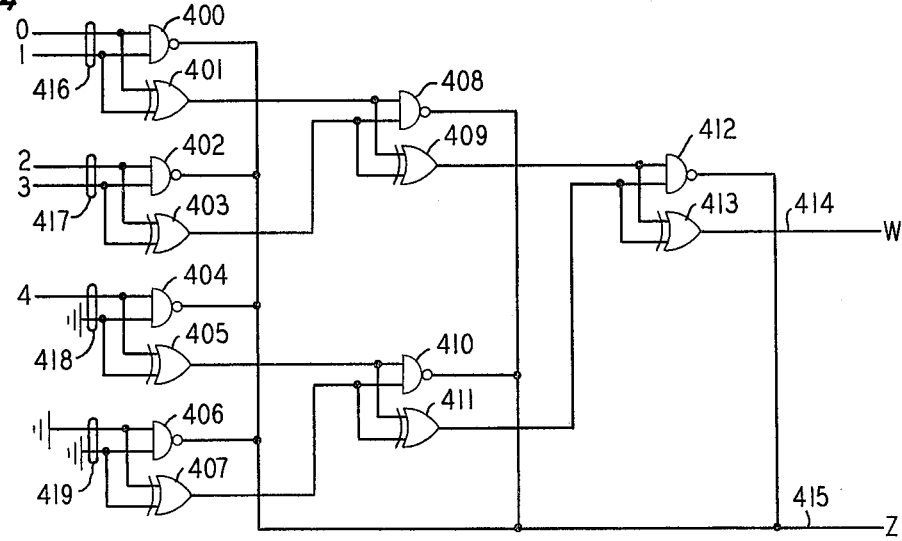
FIGS. 4 and 5 disclose the details of a one-out-of-8 detector circuit which has been modified to provide one-out-of-5 detection.

The previous discussion has involved standard detectors wherein $n$ is equal to a power of 2. FIG. 4 illustrates a nonstandard one-out-of-5 detector circuit. As previously described, the number of levels $k$ required for any number of inputs $n$ is governed by the relationship $2^{k-1} < n \leq 2^k$. In this example, $n$ is equal to 5, and therefore the above expression requires $k$ being equal to 3. A one-out-of-5 detector therefore requires three detector levels. Three detector levels accommodate eight input signals and therefore modifications must be made to the three level detector in order for it to accommodate five input signals. The following steps are performed in modifying a standard detector in order for the detector to accommodate a smaller number of inputs than the number of inputs the detector normally accommodates. These steps are as follows:
1. Ground unused inputs in each logic block contained in detector level 1;
2. Delete all NAND gates which have one input grounded;
3. Short out all EXCLUSIVE-OR gates with one input grounded, i.e., connect the remaining input to the output;
4. Delete all gates with both inputs grounded.

Figure 5:
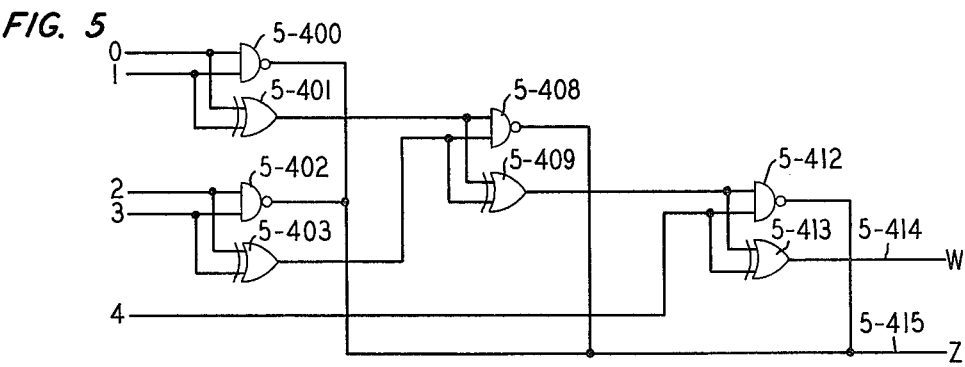

Applying this algorithm to the circuit shown in FIG. 4 results in the detector configuration shown in FIG. 5. It can be seen from the configuration in FIG. 5 that gates 404, 406, 407 and 410 have been deleted and gates 405 and 411 have been shorted out. Therefore, input signal line 4 is now directly applied to one input of gates 412 and 413. The remaining gates in the detector are unchanged.

In this manner, therefore, a detector for any value $n$ can be readily designed by first determining the number of detector levels required based on the relationship $2^{k-1} < n \leq 2^k$. Knowing the number of detector levels, the number of logic blocks required for the first or input detector level of a standard detector is determined by the relationship $x = 2^{k-1}$ where $x$ is the number of logic blocks required for the first level. Successively higher levels then have one half the number of logic blocks as does the next lower level and the $k^{th}$ always contains one logic block. Upon completion of the standard detector design, it must then be determined if the number of inputs needed is less than $2^k$. If $n$ is equal to $2^k$, then the standard detector configuration is used. If, however, $n$ is less than $2^k$, then the aforementioned algorithm must be followed in modifying the standard detector to accommodate a smaller number of inputs.

Although a specific embodiment of this invention has been shown and described, it will be understood that various modifications may be made without departing from the spirit of this invention.

We claim:
1. A one-out-of-$n$ check circuit comprising
   $k$ successive, serially connected detector levels, a first one of the detector levels having $n$ input signal lines and a plurality of logic blocks, each successive higher one of the detector levels having one half the number of input signal lines and logic blocks as does the next lower detector level, the input signal lines being arranged in pairs and a different one of the logic blocks in each detector level connected to each separate pair of input signal lines, each logic block including first and second outputs,
   means in each logic block responsive to the presence of excitation signals on both input signal lines of the pair for generating an error condition indication at the first output of the logic block,
   means in each logic block responsive to the presence of an excitation signal on one input signal line of the pair for propagating the excitation signal via the second output of the logic block to an input signal line of the next successively higher detector level, the logic block in the $k^{th}$ detector level providing at its second output a first output of the check circuit and being responsive to the presence of an excitation signal on one and only one of the input signal lines to the $k^{th}$ detector level for generating an excitation signal at its second output and
   means for connecting the first output of each logic block to a second output of the check circuit so as to provide to the second output of the check circuit an error signal responsive to the error condition indication at the first output of any logic block.

2. A one-out-of-$n$ check circuit in accordance with claim 1 wherein the generating and propagating means includes a logical NAND gate connected in parallel with a logical EXCLUSIVE-OR gate, the logical NAND gate being responsive to the presence of excitation signals on both input signal lines of the pair of input signal lines for generating the error condition indication and the logical EXCLUSIVE-OR gate being responsive to the presence of an excitation signal on one input signal line of the pair of input signal lines for propagating the excitation signal.

3. A one-out-of-$n$ check circuit in accordance with claim 1, wherein the number of logic blocks included in the first one of the detector levels is equal to $2^{k-1}$, successively higher detector levels having one half the number of logic blocks as does the next lower detector level and the $k^{th}$ detector level having one and only one logic block.

4. In a one-out-of-$n$ check circuit, $k$ successive serially connected detector levels, a first one of the detector levels having $n$ input signal lines and successively higher ones of the detector levels being serially connected to the next lower detector level and having one half the number of input signal lines as does the next lower detector level, the input signal lines to each detector level being grouped in pairs, the check circuit including,
   a plurality of logic blocks, each logic block being connected to a separate pair of input signal lines and including first means for generating the logical NAND function of excitation signals present on the pair of input signal lines and second means for generating the logical EXCLUSIVE-OR function of the excitation signals present on the pair of input signal lines, and
   means responsive to the first means of each block for providing a first check circuit output indicative of an error condition and responsive to the second means for propagating the excitation signals to successively higher detector levels and for providing a second check circuit output from the $k^{th}$ detector level.

5. In a one-out-of-$n$ check circuit, $k$ successive serially connected detector levels, each detector level including a plurality of logic blocks with a first detector level having a number of logic blocks $x$, where $x = 2^{k-1}$, successively higher detector levels having one half the number of logic blocks as does the next lower detector level, and the $k^{th}$ detector level having one logic block, each logic block in the check circuit having two inputs connected to a separate pair of detector level input signal lines and including a two input NAND gate connected to the separate pair of input signal lines, and a two input EXCLUSIVE-OR gate connected to the separate pair of input signal lines, the NAND gate having an output responsive to the presence of excitation signals on both input signal lines of the pair of input signal lines for generating a first logic block output signal, and the EXCLUSIVE-OR gate included in the logic blocks having an output responsive to the presence of an excitation signal on one input signal line of the pair of input signal lines which EXCLUSIVE-OR gate output is a second logic block output, the second logic block output of each of the logic blocks of the first $k-1$ detector levels being connected for transmitting the one excitation signal to the logic blocks in the next higher detector level, the second logic block output of the logic block included in the $k^{th}$ detector level being responsive to the presence of an excitation signal on one input signal line of the pair of input signal lines for generating a first output signal of the check circuit, and the first output of each logic block in the check circuit being connected to form a second output of the check circuit responsive to the presence of excitation signals on both input signal lines of the pair of input signal lines connected to the inputs of any logic block in the check circuit.

* * * * *